US008553334B2

(12) United States Patent
Lambert et al.

(10) Patent No.: US 8,553,334 B2
(45) Date of Patent: Oct. 8, 2013

(54) HEADS-UP DISPLAY SYSTEM UTILIZING CONTROLLED REFLECTIONS FROM A DASHBOARD SURFACE

(75) Inventors: David K. Lambert, Sterling Heights, MI (US); Frederick F. Kuhlman, Kokomo, IN (US); Dwadasi H. R. Sarma, Kokomo, IN (US); Kris R. Stark, Carmel, IN (US); Michel F. Sultan, Troy, MI (US); Gail M. Sylvester, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 126 days.

(21) Appl. No.: 13/297,980

(22) Filed: Nov. 16, 2011

(65) Prior Publication Data
US 2013/0120825 A1    May 16, 2013

(51) Int. Cl.
*G02B 27/14*    (2006.01)
*G09G 5/00*    (2006.01)

(52) U.S. Cl.
USPC .............................................. 359/630; 345/7

(58) Field of Classification Search
CPC .............. G02B 27/01; G02B 27/0101; G02B 27/0149; G02B 27/024; G02B 27/026; G02B 27/143
USPC ...................... 345/7; 359/290, 630, 631, 633
See application file for complete search history.

(56) References Cited

U.S. PATENT DOCUMENTS

| | | | |
|---|---|---|---|
| 4,961,625 A * | 10/1990 | Wood et al. | 359/630 |
| 6,979,499 B2 | 12/2005 | Walck et al. | |
| 7,777,960 B2 | 8/2010 | Freeman | |
| 2013/0120850 A1* | 5/2013 | Lambert et al. | 359/630 |

FOREIGN PATENT DOCUMENTS

WO    2011/015843 A2    2/2011

OTHER PUBLICATIONS

Lincoln, et al.: "How a Laser Hud Can Make Driving Safer", Microvision, Inc., Mar. 2007, pp. 1-8.

* cited by examiner

*Primary Examiner* — David N Spector
(74) *Attorney, Agent, or Firm* — Robert J. Myers

(57) ABSTRACT

A heads-up display system is configured for use in a vehicle. The system includes a standard vehicle window (i.e. no special coatings), an image projector, and a vehicle dashboard equipped with a faceted reflective surface. The image projector is configured to project an image onto the faceted reflective surface. The faceted reflective surface is configured to reflect the image from the image projector onto a window surface of the standard vehicle window. The window surface is oriented to reflect the image from the faceted reflective surface toward an occupant. The faceted reflective surface may be disposed within a plurality of troughs separated by a plurality of diffuse reflecting partitions. The plurality of troughs may be configured to shield the occupant from extraneous reflections. The faceted reflective surface may include a plurality of electrically controlled facets. The plurality of electrically controlled reflective facets may be an array of electrowetting cells.

20 Claims, 5 Drawing Sheets

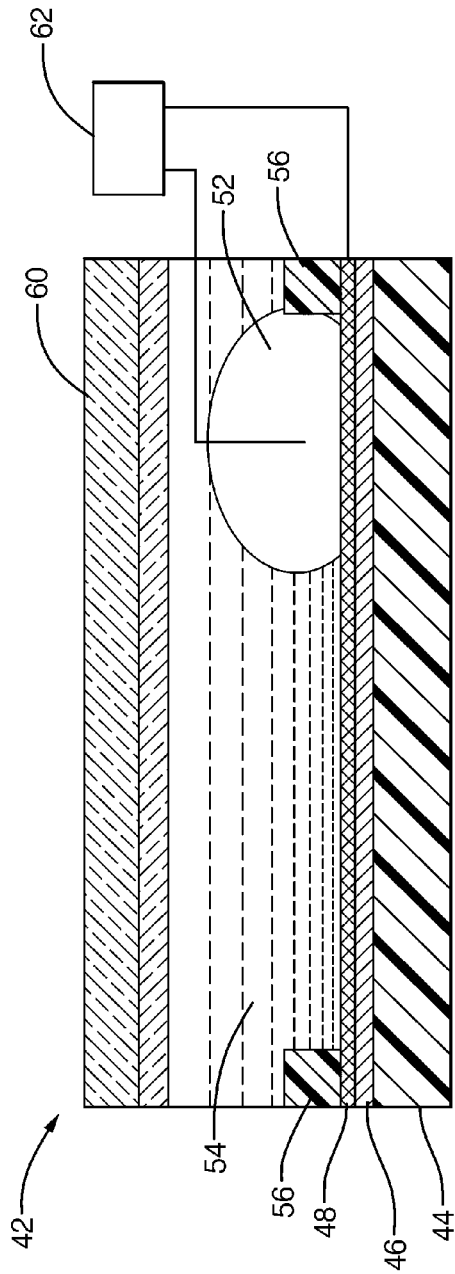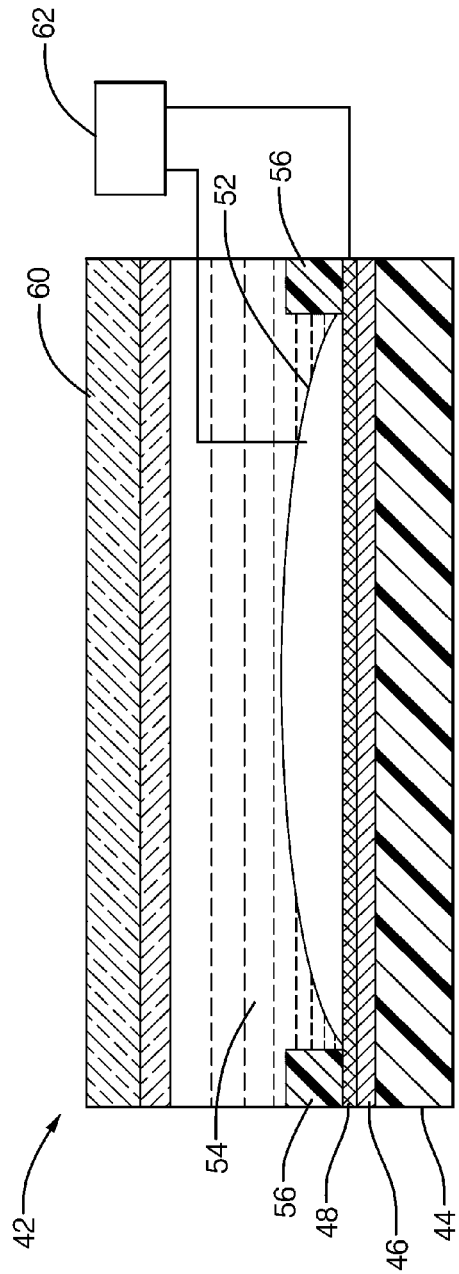

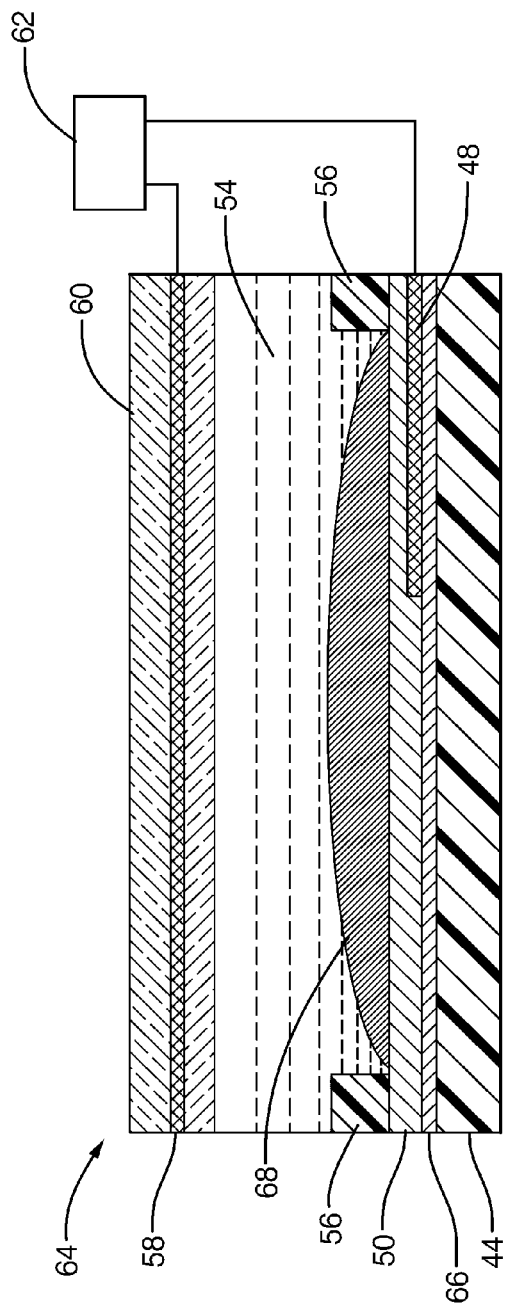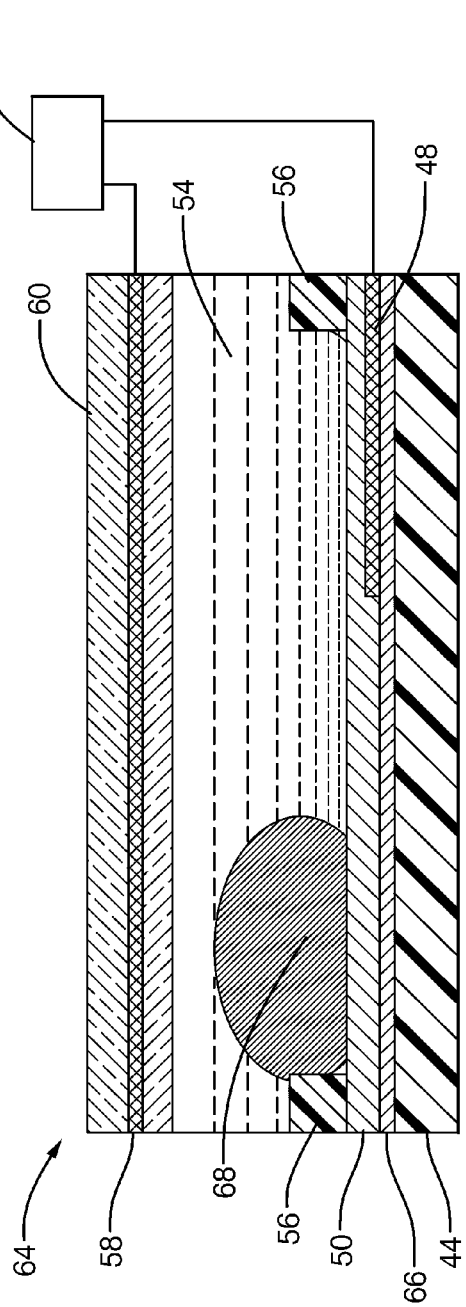

HEADS-UP DISPLAY SYSTEM UTILIZING CONTROLLED REFLECTIONS FROM A DASHBOARD SURFACE

TECHNICAL FIELD OF INVENTION

The invention generally relates to heads-up displays for motor vehicles, and more particularly relates to a heads-up display configured to reflect an image from a reflective surface on the dashboard to a large portion of a vehicle window.

BACKGROUND OF INVENTION

There is a need to display graphical information to a vehicle occupant, particularly the driver, on a large portion of a vehicle window, particularly the front windshield, to overlay the occupant's view of the outside scene. Potential uses include outlining important signs, helping the occupant to notice pedestrians, and showing road boundaries. Such applications are often referred to as augmented reality.

Potential uses for such a wide-area heads-up display for vehicle navigation were identified by Swedish researchers Martin Johansson and Marten Pettersson in an occupational study of delivery truck drivers "Eyes on the Road—Augmenting Traffic Information," published in Proceedings of DARE 2000 on Designing Augmented Reality Environments, April 2000, pp. 147-148, (Association for Computing Machinery). Without proposing an implementation, Johansson and Pettersson found that the delivery truck driver's job would be simplified by adding visual hints to the scene viewed by the driver through the windshield.

One prior art implementation of such a wide-area heads-up display has employed a fluorescent film in or on the front windshield. The fluorescent film is excited with an ultraviolet (UV) laser beam. Both vector scanning and raster scanning methods have been demonstrated. However, this heads-up display has several significant shortcomings. The display has insufficient brightness for daytime use. There may also be concerns regarding the use of a high power UV laser in the passenger compartment of a vehicle.

Another prior art implementation of a wide-area windshield display utilizes an array of microlenses disposed inside a laminated windshield. To display an image, the windshield is illuminated by scanning with a visible laser. The driver views laser light, scattered by the microlenses. However, placing light scattering elements, such as microlenses, inside a windshield may degrade the transmittance of the windshield and cause objects viewed through the windshield to have a hazy appearance.

SUMMARY OF THE INVENTION

In accordance with one embodiment of this invention, a heads-up display system configured for use in a motor vehicle is provided. The system includes a standard vehicle window, an optical image projector, and a vehicle dashboard equipped with a faceted reflective surface. The optical image projector is configured to project an image onto the faceted reflective surface. The faceted reflective surface is configured to reflect the image from the optical image projector onto a window surface of the standard vehicle window. The window surface is oriented to reflect the image from the faceted reflective surface toward an occupant.

In another embodiment of the present invention, a wide area heads-up display system is provided. The window surface may be a windshield surface. The reflected image may appear to the occupant as a virtual image occupying a wide portion of the windshield surface.

In another embodiment of the present invention, a vehicle dashboard assembly configured for use in a heads-up display system is provided. The assembly includes a dashboard and a faceted reflective surface. The faceted reflective surface is configured to reflect an image projected onto the faceted reflective surface onto a vehicle window surface such that the image is reflected toward an occupant.

In yet another embodiment of the present invention, a faceted reflective surface configured to be coupled to a dashboard is provided. The faceted reflective surface includes a plurality of reflective facets.

In another embodiment of the present invention, the plurality of reflective facets are disposed within a plurality of troughs separated by a plurality of diffuse reflecting partitions, wherein the plurality of troughs are configured to shield said occupant from extraneous reflections.

In another embodiment of the present invention, the plurality of troughs is covered by a transparent material.

In another embodiment of the present invention, the faceted reflective surface includes a plurality of electrically controlled reflective facets.

In another embodiment of the present invention, the plurality of electrically controlled reflective facets is an array of electrowetting cells comprising a reflective fluid.

In another embodiment of the present invention, the plurality of electrically controlled reflective facets is an array of electrowetting cells comprising an oil layer of opaque material overlaying a layer of reflective material.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which:

FIG. 6a is a cross-sectional view of an electrowetting cell in the faceted reflective surface of FIG. 5 depicted in a non-reflective state in accordance with the second embodiment;

FIG. 6b is a cross-sectional view of an electrowetting cell in the faceted reflective surface of FIG. 5 depicted in a reflective state in accordance with the second embodiment;

FIG. 7a is a cross-sectional view of an electrowetting cell in the faceted reflective surface of FIG. 5 depicted in a reflective state in accordance with a third embodiment; and FIG. 7b is a cross-sectional view of an electrowetting cell in the faceted reflective surface of FIG. 5 depicted in a non-reflective state in accordance with the third embodiment.

DETAILED DESCRIPTION OF INVENTION

It is desirable to provide information to an occupant of a motor vehicle, particularly a driver, in a manner that does not draw attention away from the view outside of the vehicle. Therefore, it may be desirable to display information for the driver as an image superimposed over the scene viewed through a vehicle window, typically a vehicle windshield. The heads-up display system presented herein projects an image directly onto a surface of the vehicle's dashboard. A portion of the dashboard contains a reflective surface that preferentially reflects the projected light to a vehicle window from which the light is specularly reflected toward the occupant. As used herein, specularly reflected means reflected in a minor-like manner. The reflected image is seen by the occupant as a virtual image that appears to be outside of the vehicle. The virtual image may present graphical information to the occupant, approximately registered with the outside scene as viewed by the driver through the window. The image projected on the reflective surface of the dashboard is precompensated to eliminate the geometrical distortion that would otherwise be caused by the curved shape of the surface of the dashboard and the curved window.

While it may be possible to project an image onto the surface of a conventional dashboard that can be characterized as having a diffuse reflecting surface, with sufficient brightness for the reflected image to be clearly seen in the window overlaid on a scene illuminated by direct sunlight, the brightness of the projected image would need to be high. As a non-limiting example, for the image to be sufficiently visible in direct sunlight, a laser image projector with a laser output power of the on the order of 100 milliwatts may be required. The reflective surface presented herein provides adequate visibility for a projector with a much lower power output. This may improve eye safety due to a lower power laser beam, reduce cost, save energy, and avoid distraction to the driver caused by directly seeing a bright projected image on the dashboard.

Figure 1:
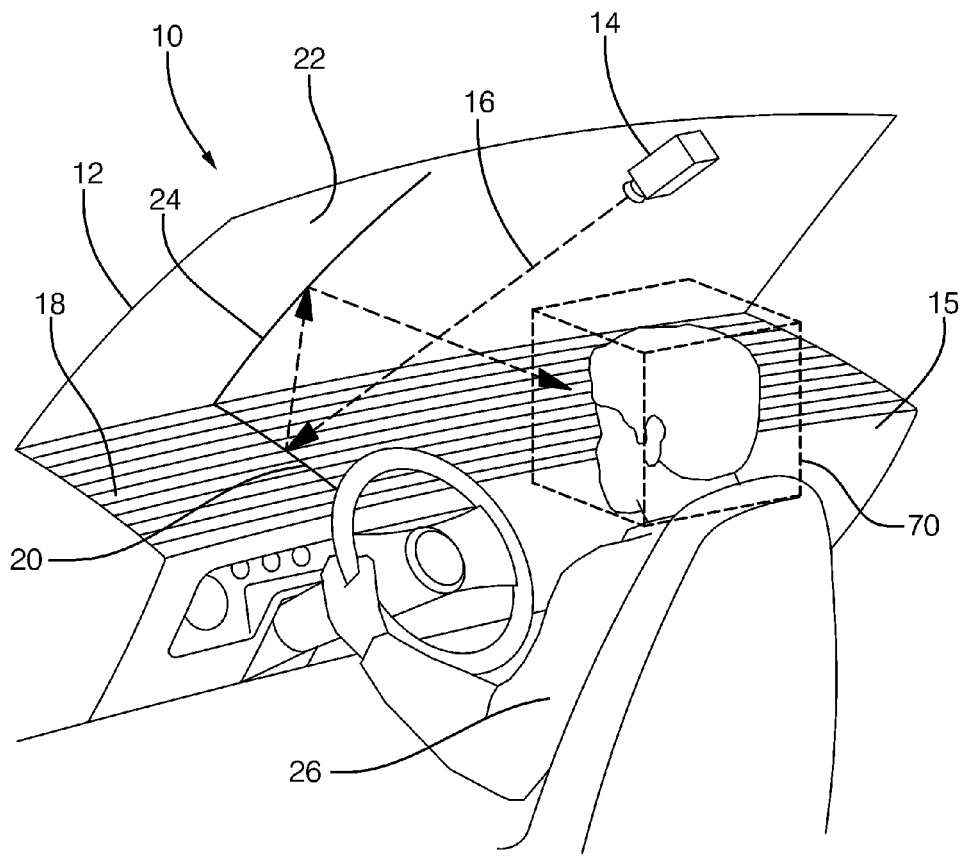
FIG. 1 is a perspective view of a heads-up display system, in accordance with one embodiment.

FIG. 1 illustrates a non-limiting example of a heads-up display system 10 configured for use in a motor vehicle. The system includes a standard vehicle window 12, an optical image projector 14, and a vehicle dashboard 15 equipped with a faceted reflective surface 18. The optical image projector 14 is configured to project an image illustrated for the purpose of simplicity in this non-limiting example as a light beam 16 to form a projected image 20 onto the faceted reflective surface 18. The faceted reflective surface 18 is configured to preferentially reflect the light from the optical image projector 14 that forms the projected image 20, in the appropriate direction to be specularly reflected from window surface 22, and be seen by the occupant 26 as virtual image 24. The window surface 22 is configured to reflect the virtual image 24 from the faceted reflective surface 18 toward an occupant 26, in particular the occupant's eyes.

As used herein, a standard vehicle window 12 is a vehicle window constructed of tempered or laminated safety glass without any additional coatings or layers to provide polarization, diffuse scattering, fluorescence, a wedge angle between the two exterior surfaces, or other features not typically provided by a vehicle window. As such, any heads-up display system that relies on any special coating or layer on the vehicle window is specifically excluded.

Figure 2:
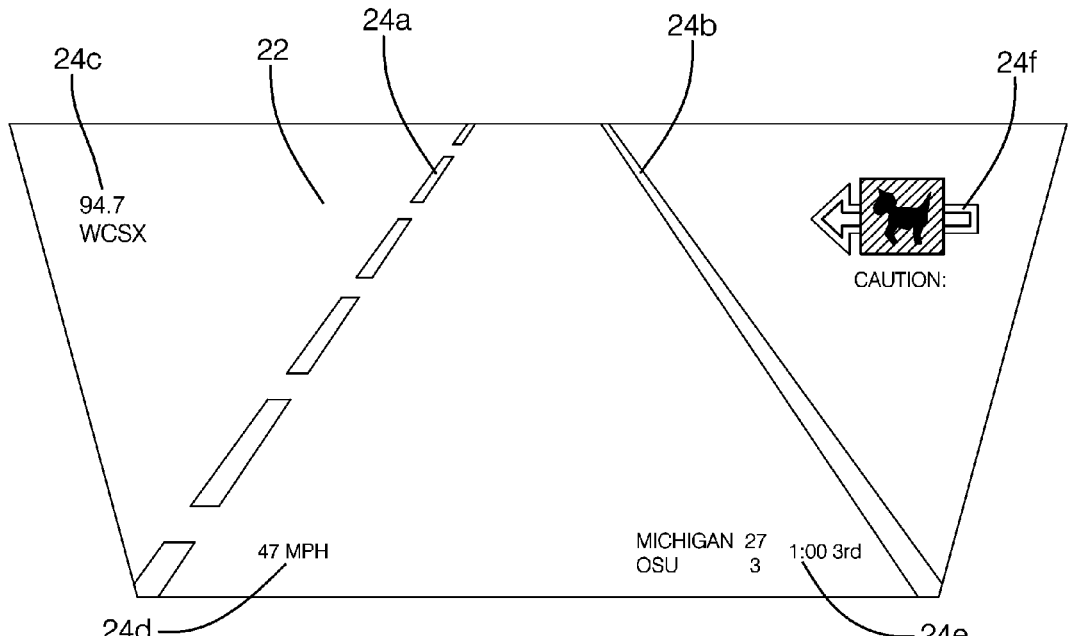
FIG. 2 is forward view of an image shown by the system of FIG. 1, in accordance with one embodiment.

FIG. 2 illustrates a non-limiting example of images projected onto the window 12, in this case a vehicle windshield, and the window surface 22 is an inside windshield surface. As shown in FIG. 2, the heads-up display system 10 may be configured so that the virtual image 24 may appear to the occupant 26 to occupy a wide portion of the windshield surface. As used herein, a wide portion of the windshield surface means projecting an image that appears to be wider than 300 mm. Prior art heads-up displays typically displayed an image on a relatively narrow portion of the window surface (approx. 150 mm). The lane markers 24a, 24b are aligned with actual lane markers on the roadway (not shown) to enhance the driver's ability to determine the position of the vehicle relative to the roadway. This may be especially helpful during certain driving conditions such as at night while it is raining or when oncoming headlights from other vehicles make it difficult to see the actual roadway marker. Vehicle system status, such as audio system information 24c and vehicle speed 24d may be presented to the driver. Information from external sources, such as news information 24e or roadside warning systems 24f, may also be displayed.

Figure 3:
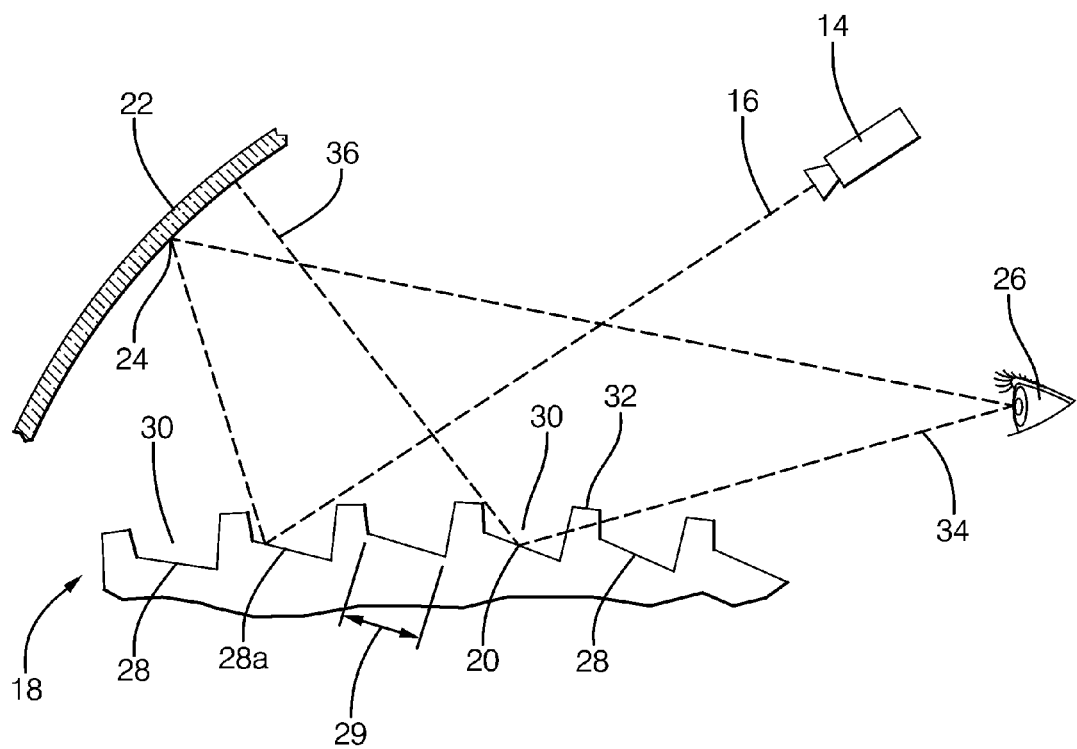
FIG. 3 is a cross-sectional view of the faceted reflective surface of FIG. 1, in accordance with one embodiment.

FIG. 3 illustrates a non-limiting example of an embodiment wherein the faceted reflective surface 18 includes a plurality of reflective facets 28 that includes reflective facet 28a. The plurality of reflective facets 28 may have a light shaping texture (similar to an anti-glare coating applied to flat panel displays) so that when the light beam 16 is reflected from facet 28a, it fills head box 70 that includes the occupant's eyes. The head box 70, shown in FIG. 1, represents a space that the occupant's head may occupy to view a satisfactory image from the heads-up display system 10. As a non-limiting example, the reflective facets 28 may be constructed of a light shaping metallized film, such as Lights On Reflective Screen (LORS) manufactured by Luminit LLC, 1850 West 205th Street, Torrance, Calif. 90501-1821. As an alternative to the use of flat facets with anti-glare coating, the plurality of reflective facets 28 may be curved so the reflected light fills the desired head box 70.

Alternately, the plurality of reflective facets 28 may be constructed of a glossy plastic. The reflective surface 18 may be molded into a surface of the dashboard 15 using an injection molding process similar to known manufacturing processes for dashboards.

Referring again to FIG. 3, the pitch 29 of each reflective facet 28 may be approximately 0.5 to 1.0 mm. One constraint on the size of the reflective facets 28 is that the reflective facet 28 should be significantly larger than the wavelength of the light (e.g. 0.75 µm for red light, which is the visible color with the longest wavelength) to avoid diffraction. Another constraint on the size of the reflective facets 28 is that the reflective facet 28 should be small enough to provide the necessary imaging resolution. Each reflective facet 28 may be optimally oriented to preferentially reflect a light beam 16 from the optical image projector 14 to the window surface 22, where it is specularly reflected from the window surface 22 to the occupant 26. Equivalently, a light ray that begins at the eye of occupant 26, and specularly reflects from the window surface 22 to the reflective facet 28, may be preferentially reflected by the reflective facet 28 to the optical image projector 14.

The plurality of reflective facets 28 may be disposed within a plurality of troughs 30 separated by a plurality of partitions 32. The plurality of partitions 32 may be configured so that they appear as a single diffuse reflecting surface to the occupant 26, like a conventional dashboard. Again, the walls of the plurality of troughs 30 may also have a diffuse reflecting surface, so to the occupant 26 they appear as a single diffuse reflecting surface. The plurality of troughs 30 may be configured to shield the occupant 26 from an extraneous reflection 34 caused by extraneous light 36 coming through the window surface 22. The plurality of troughs 30 and the plurality of diffuse reflecting partitions 32 may be arranged so a portion of the light from the projector reaches the facets to form the projected image 20 on the plurality of facets, which may then be specularly reflected in the appropriate direction from each reflective facet 28 to specularly reflect from the window 12, and may then be seen by the occupant 26.

The plurality of partitions 32 may be configured to prevent the occupant 26 from directly viewing the plurality of reflective facets 28. Consequently, independently of the direction from which extraneous light 36 enters the window 12, the occupant 26 will not see the extraneous light 36 as glare specularly reflected as an extraneous reflection 34 from the plurality of reflective facets 28. Instead, the occupant 26 directly sees a diffusely reflecting surface. The depth of each trough in the plurality of troughs 30 and the width of each partition in the plurality of partitions 32 may be selected so as to prevent a ray 34 from directly reaching any reflective facet 28, if the ray 34 passes directly to the facet from a point within the eye ellipse of a seated front seat occupant. To ensure the condition is met, the tallest possible driver and front seat passenger may be considered.

The plurality of troughs 30 may be preferentially covered by a transparent, material, such as an acrylic plastic, to prevent dust and other foreign material from collecting within the plurality of troughs 30 during the life of the vehicle.

Figure 4:
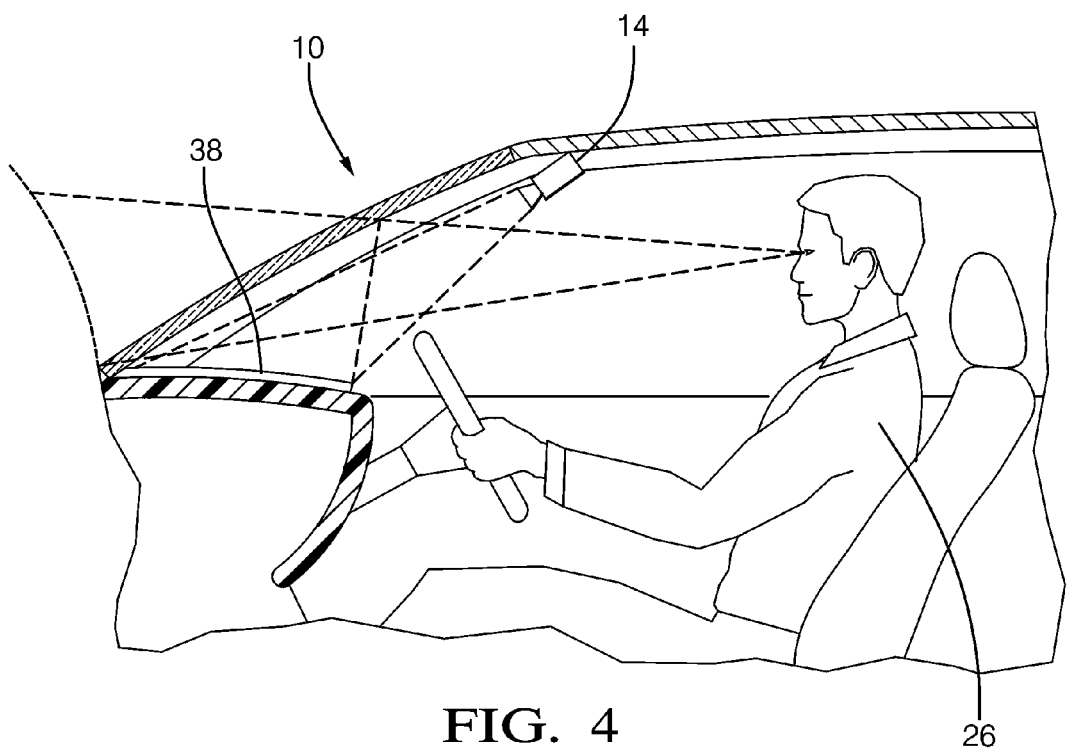
FIG. 4 is a cross-sectional view of a heads-up display system in accordance with a second embodiment.

FIG. 4 illustrates a non-limiting example of an embodiment of a heads-up display system 10 wherein the faceted reflective surface 18 includes a plurality of electrically controlled reflective facets 38. In a non-limiting example, the electrically controlled facets may be an array of electrowetting cells 40, also known as electrowetting light valves (ELV). The use of other types of electrically controlled facets such as a digital micro-minor used in the digital light processors manufactured by Texas Instruments is also envisioned.

In one state, the electrically controlled reflective facets 38 may be controlled to direct reflected light in the appropriate direction, for example so the image may be viewed by the occupant 26. In a second mode, with the wide area window display inactive, the cells may be commanded to a preferred configuration that does not allow the occupant 26 to see glare from an extraneous light 36.

Figure 5:
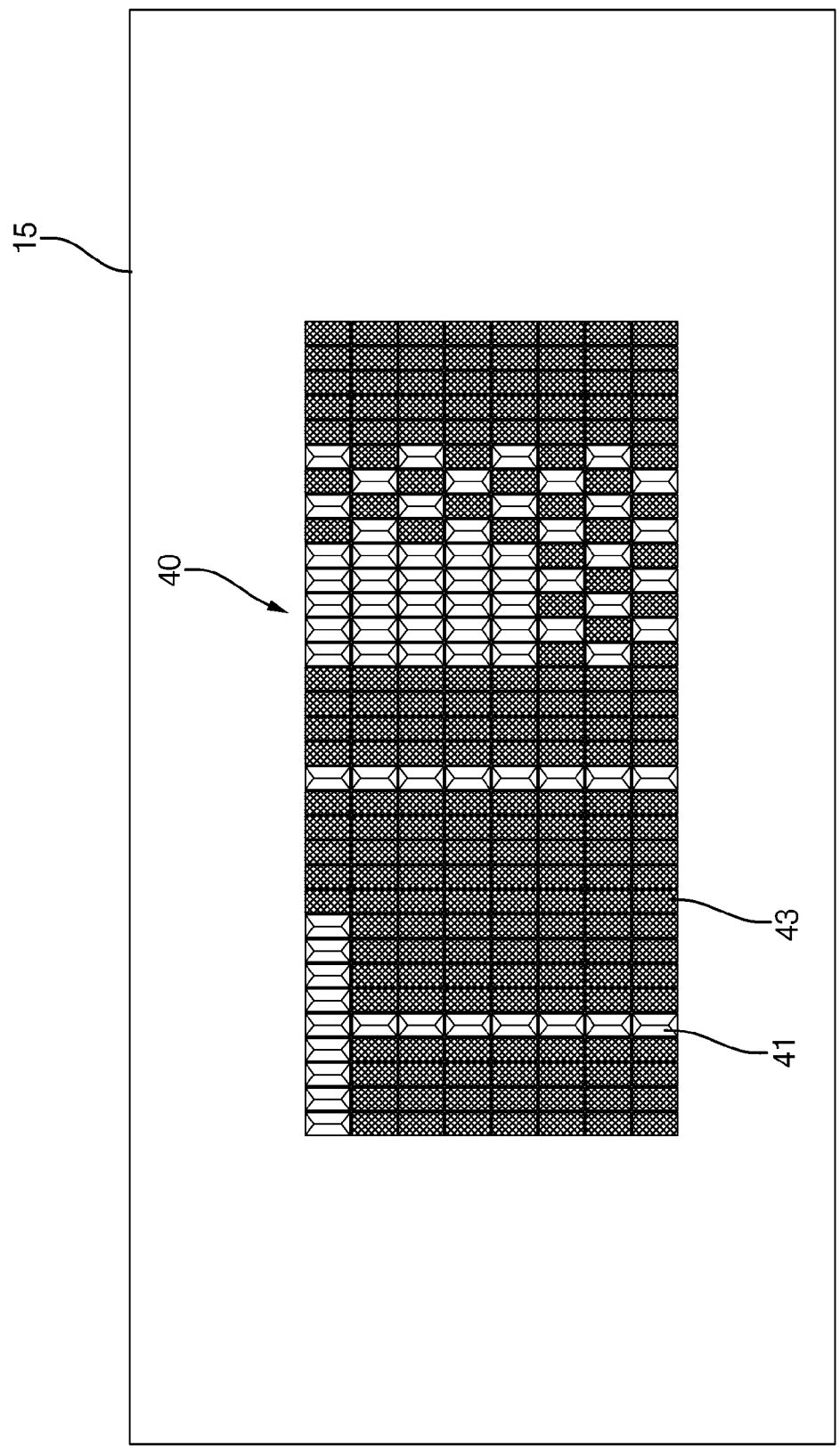
FIG. 5 is a top view of the faceted reflective surface of FIG. 3, in accordance with the second embodiment.

FIG. 5 illustrates a non-limiting example of an embodiment of wherein the plurality of electrically controlled reflective facets 38 may be an array of electrowetting cells 40 comprising a reflective fluid. As a non-limiting example, as shown in FIG. 5 the "on" state 41 may be reflective and the "off" state 43 may be opaque.

FIGS. 6a and 6b illustrate a non-limiting example of an electrowetting cell 42 comprising a reflective metallic fluid. The electrowetting cell 42 may be generally carried by a supporting substrate 44. The supporting substrate 44 may be chosen from rigid or flexible optically transparent or reflective materials including but not limited to glasses, polymers, metals, or crystals. An opaque surface 46 may be formed on the supporting substrate 44. The opaque surface 46 provides a non-reflective surface when the electrowetting cell 42 is in a non-reflective state.

Placed on or adjacent to the opaque surface 46 is a first transparent electrode 48 that may be comprised of, but is not limited to, very thin metals, metal meshes, thin semiconductors, thin conducting polymers, thin transparent conducting oxides such as indium tin oxide (ITO), or combinations thereof. The first transparent electrode 48 functions to provide voltage while additionally providing transparency to light. Although not shown, the opaque surface 46 may be electrically isolated from first transparent electrode 48 by one more additional electrical insulating layers.

An amount of a reflective fluid 52 and an amount of a substantially transparent fluid 54 may be situated above the first transparent electrode 48. Reflective fluid 52 and transparent fluid 54 are not miscible with one another. Preferably, transparent fluid 54 is highly transparent to light entering the electrowetting cell 42 whereas reflective fluid 52 is highly reflective to light entering the electrowetting cell 42 device. The reflective fluid 52 may be a eutectic alloy consisting essentially of gallium, indium, and tin, such as the alloy GALINSTAN® available from Geratherm Medical AG of Geshwenda, Germany.

Continuing to refer to FIGS. 6a and 6b, two separators 56 flank the sides of the reflective fluid 52. These separators effectively prevent the reflective fluid 52 from escaping the electrowetting cell 42. Suitable hydrophilic materials for separator 56 include, but are not limited to, acrylics, nylon, polyester, metals, semiconductors, insulators, titanium based oxides, black paints or inks, color or white paints or inks, reflective paints or inks, and other materials that have high surface energy.

Generally, the electrowetting cell 42 will be sealed by a sealing substrate 60. Like the supporting substrate 44, the sealing substrate 60 may be comprised of, but is not limited to, rigid glasses or flexible polymers.

The first transparent electrodes and the reflective fluid 52 are electrically coupled with a voltage source 62. This application of a voltage to the electrode and the reflective fluid 52 controls the switching of electrowetting cell 42, which will be described below.

Referring now to FIG. 6a, when no voltage is applied by the voltage source 62 between the reflective fluid 52 and the electrode, surface tension of the reflective fluid 52 holds the fluid generally in the shape shown, therefore a substantial portion of the electrowetting cell 42 as viewed through the sealing substrate 60 is the opaque surface 46.

Referring now to FIG. 6b, when a voltage is applied by the voltage source 62 between the reflective fluid 52 and the electrode, the interface between the reflective fluid 52 and the electrode behaves like a parallel-plate capacitor to induce a charge on the liquid surface that lowers the effective surface tension of the reflective fluid 52 so that the reflective fluid 52 generally takes the shape shown. Therefore a substantial portion of the cell as viewed through the sealing substrate 60 is the reflective surface of the reflective fluid 52.

FIGS. 7a and 7b illustrate a non-limiting example of an electrowetting cell 64 comprising an oil layer of opaque material overlaying a layer of reflective material. The electrowetting cell 64 may be generally carried by a supporting substrate 44. The supporting substrate 44 may be chosen from rigid or flexible optically transparent or reflective materials including but not limited to glasses, polymers, metals, or crystals. A reflective surface 66 may be formed on the supporting substrate 44.

Placed on or adjacent to the reflective surface 66 is a first transparent electrode 48 that may be comprised of, but is not limited to, very thin metals, metal meshes, thin semiconductors, thin conducting polymers, thin transparent conducting oxides such as indium tin oxide (ITO), or combinations thereof. The first transparent electrode 48 functions to provide voltage while additionally providing transparency to light. Although not shown, the opaque surface 46 may be electrically isolated from first transparent electrode 48 by one more additional electrical insulating layers.

A hydrophobic insulator 50 may be carried by the first transparent electrode 48. The hydrophobic insulator 50 may be at least partially covering one or more internally exposed solid surfaces of the electrowetting cell 64. Materials suitable for hydrophobic insulator 50 include but are not limited to fluoropolymers such as TEFLON® AF (DuPont Corp.), FLUOROPEL™ (Cytonix Corp.), CYTOP® (Asahi Glass), or low surface energy polymers such as PARYLENE® (Cookson Inc.).

An amount of an opaque fluid 68 and an amount of a transparent fluid 54 may be situated above the hydrophobic insulator 50. Opaque fluid 68 and transparent fluid 54 are not miscible with one another. Preferably, transparent fluid 54 is highly transparent to light entering the electrowetting cell 64 whereas opaque fluid 68 is highly opaque to light entering the electrowetting cell 64. Neither, either, or both opaque fluid 68 and transparent fluid 54 may contact multiple or one of the surfaces of the sides, upper, or lower internal solid features of the electrowetting cell 64. The opaque fluid 68 may be a non-polar black or colored fluid. As understood by a person of ordinary skill in the art, a non-polar molecular substance like transparent fluid 54 lacks concentrations of positive or negative electric charge. Substances suitable for use as non-polar transparent fluid 54 include, but are not limited to, hydrocarbon liquids like alkanes, fluorocarbon liquids, silicone or siloxane liquids, non-polar solvents, and mixtures thereof. Transparent fluid 54 may be a polar fluid. Substances suitable for use as polar opaque fluid 68 include, but are not limited to, water, dimethyl-sulfoxide, and mixtures thereof. As understood by a person of ordinary skill in the art, polar molecular substances, like transparent fluid 54, are virtually insoluble in non-polar molecular substances, like opaque fluid 68.

Continuing to refer to FIGS. 7a and 7b, two separators 56 flank the sides of the opaque fluid 68. These separators effectively prevent the opaque fluid 68 from escaping the electrowetting cell 64. Suitable hydrophilic materials for separator 56 include, but are not limited to, acrylics, nylon, polyester, metals, semiconductors, insulators, titanium based oxides, black paints or inks, color or white paints or inks, reflective paints or inks, and other materials that have high surface energy.

A second transparent electrode 58 may be provided above, or adjacent to, opaque fluid 68 and transparent fluid 54. This second transparent electrode 58 is capacitively coupled to opaque fluid 68 and transparent fluid 54. This second transparent electrode 58, which may be formed from the same constituent material(s) as first transparent electrode 48, serves as a counter electrode to first transparent electrode 48. Generally, the second transparent electrode 58 will be carried by a sealing substrate 60. Like the supporting substrate 44, the sealing substrate 60 may be comprised of, but is not limited to, rigid glasses or flexible polymers.

The first transparent electrodes and the second transparent electrode 58 are electrically coupled with a voltage source 62. The voltage source 62 allows for application of an electric field across the opaque fluid 68, transparent fluid 54, and insulator. This application of electric field controls the switching of electrowetting cell 64, which will be described below.

Referring now to FIG. 7a, when no voltage is applied to the electrowetting cell 64, the system of opaque fluid 68 and transparent fluid 54 will orient itself in the geometrical fashion shown in FIG. 7a. As shown in FIG. 7a, the opaque fluid 68, which may be non-polar, forms a continuous or covering film over all or part of the hydrophobic insulator 50. This configuration of the liquid system comprising opaque fluid 68 and transparent fluid 54 is given by the interfacial surface tension relationship between the polar transparent fluid 54, nonpolar opaque fluid 68, and the hydrophobic dielectric. This configuration in FIG. 7a is for an electrowetting cell 64 in the 'OFF' state. In the OFF state the voltage source 62 supplies no voltage, or inadequate voltage, to the first transparent electrode 48 and second transparent electrode 58 and causes the geometrical configuration of the liquids to suppress light reflection from the reflective surface 66 of the electrowetting cell 64.

Referring now to FIG. 7b, when sufficient voltage is applied by the voltage source 62, The opaque fluid 68 is repelled from covering the reflector, allowing light entering the electrowetting cell 64 to be reflected from the reflective surface 66. The applied voltage from the voltage source 62 increases the electric field applied to the system, and causes the polar transparent fluid 54 to be attracted to the hydrophobic insulator 50.

Since automotive systems are typically required to function at temperatures of −40° C., the plurality of electrically controlled reflective facets 38 may need to be heated when ambient temperatures fall below the freezing temperature of the fluid materials in the plurality of electrically controlled reflective facets 38. Since the reflective surface 18 is disposed on the dashboard 15, the defroster ducts of the vehicle's heating, ventilation and air conditioning (HVAC) system could provide heat to the reflective surface 18. Because the defroster ducts derive their heat from the engine coolant, they will not be able to provide heat to the reflective surface 18 immediately after engine start up, therefore an auxiliary electric heating element may be configured to provide heat to the reflective surface 18 until sufficient heat can be provided by the HVAC system. It may be preferred to provide heat from the HVAC system since that is waste energy from the engine rather than providing heat from an electric heater that is powered by the engine driven alternator.

Referring once more to FIG. 1, the optical image projector 14 may be a scanning laser projector, such as a laser picoprojector manufactured by MicroVision, LG, Uniden, or a number of other manufacturers. The optical image projector 14 may include a controller configured to adjust said projected image 20 based on a vehicle dashboard curvature and a vehicle window curvature.

The optical image projector 14 may be positioned so the light beam 16 has optical access to at least a portion of the area of each of the plurality of facets, but the driver and front seat passenger are unable to directly see the plurality of facets. For example, the troughs 30 or partitions 32 may be arranged as lines, radiating away from the projector location. One possible location of the optical image projector 14 is on the vehicle's A-pillar. Other possible locations include behind the rear-view mirror, above the top of the front windshield, and beneath the dash, reflecting from one or more mirrors elevated above the surface of the dash. An optical image projector 14 with a laser and scanner does not necessarily need to have the laser and scanner collocated. One or more intermediate mirrors, optical fibers, or the like, can be used to bring the light beam 16 to the desired location.

To avoid having the occupant 26 see too much glare from extraneous light 36, the system should block extraneous light 36 from reaching the plurality of reflective facets 28 from a direction that allows too much light to be reflected by the facet, to be subsequently specularly reflected from the window 12, to the occupant's eyes. Typically, this requirement is satisfied automatically if the facets scatter collimated light into a small enough cone of angles. For example, if the optical image projector 14 is located on the A-pillar, the A-pillar is opaque and blocks the sunlight that would otherwise shine in the direction that light comes from the optical image projector 14. As long as sunlight that misses the A-pillar, but reaches a facet, does not scatter to be specularly reflected from the window 12 to the occupant's eye with appreciable intensity, the requirement is satisfied.

It should be understood, that while a laser has been used in the description of the embodiments, laser light is not essential to the concept. Any source of visible light can be used that is capable of creating an image on the dashboard 15 with sufficient brightness and resolution.

The controller may be further configured to determine an occupant 26 eye location and adjust said projected image 20 based on the occupant 26 eye location. The heads-up display system 10 may adjust the location of the head box 70 of the display to match the occupant's head position. One means to adjust the location of the head box 70 of the display may be to translate the location of the optical image projector 14. Alternately, the electrically controlled reflective facets 38 may be controlled to direct reflected light in the appropriate direction to adjust the head box 70 of the display.

The head box 70 location adjustment may be controlled by the occupant 26. As a non-limiting example, the occupant 26 may use a rotary knob connected to the controller to adjust the optical image projector 14 location and orientation and hence the location of the head box 70. Alternatively, the controller may automatically adjust the location of the head box 70 to match the position of the occupant's eyes. One means to determine the location of the occupant's eyes uses a camera system to determine eye position. Alternatively, the position of the occupant's eyes, particularly the driver's eyes, can be approximately inferred from the orientation of the rear view minor and side view minors and other data such as the location and adjustments of the driver's seat.

The heads-up display system 10, as envisioned here, may be complementary to a conventional head-up display (HUD). For a conventional HUD, the graphics may be viewed continuously by the occupant 26, and thus crisp, sharp lines may be preferred. To avoid having the occupant 26 see a double image, a HUD may typically use a wedged window. However, the wedged window may be more costly to manufacture than a standard window 12 and may have a higher replacement cost than a standard window 12.

Accordingly, a heads-up display system 10, vehicle dashboard assembly configured for the heads-up display system 10 and a faceted reflective surface 18 configured to be coupled to the vehicle dashboard assembly is provided. The heads-up display system 10 may be configured to provide a display covering a wide portion of a windshield surface 22, enabling a driver to be alerted to conditions without taking his or her eyes off of the driving scene. An advantage of the heads-up display system 10 over the prior art heads-up displays is that a standard window 12 can be used. There are no polarizers, diffusers, fluorescent materials, or wedges added to the window to cause haze, reduce clarity, or increase cost.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A heads-up display system configured for use in a motor vehicle, wherein said system comprises:
    a standard vehicle window;
    an optical image projector; and
    a vehicle dashboard equipped with a faceted reflective surface, wherein the optical image projector is configured to project an image onto the faceted reflective surface, the faceted reflective surface is configured to reflect the image from the optical image projector onto a window surface of the standard vehicle window, and the window surface is oriented to reflect the image from the faceted reflective surface toward an occupant.

2. The system of claim 1, wherein said window surface is a windshield surface, wherein said reflected image appears to said occupant to occupy a wide portion of said windshield surface.

3. The system of claim 1, wherein said optical image projector is a scanning laser projector.

4. The system of claim 1, wherein said optical image projector includes a controller configured to adjust said projected image based on a vehicle dashboard curvature and a vehicle window curvature.

5. The system of claim 4, wherein said controller is further configured to determine a vehicle occupant eye location and adjust said projected image based on the vehicle occupant eye location.

6. The system of claim 1, wherein said faceted reflective surface includes a plurality of reflective facets.

7. The system of claim 6, wherein said plurality of reflective facets are disposed within a plurality of troughs separated by a plurality of diffuse reflecting partitions, wherein the plurality of troughs are configured to shield said occupant from extraneous reflections.

8. The system of claim 7, wherein said plurality of troughs are covered by a transparent material.

9. The system of claim 1, wherein said faceted reflective surface includes a plurality of electrically controlled reflective facets.

10. The system of claim 9, wherein said plurality of electrically controlled reflective facets is an array of electrowetting cells comprising a reflective fluid.

11. The system of claim 9, wherein said plurality of electrically controlled reflective facets is an array of electrowetting cells comprising an oil layer of opaque material overlaying a layer of reflective material.

12. A vehicle dashboard assembly configured for use in a heads-up display system, said assembly comprises:
    a dashboard; and
    a faceted reflective surface, wherein the faceted reflective surface is configured to reflect an image projected onto the faceted reflective surface onto a vehicle window surface such that the image is reflected toward an occupant.

13. The assembly of claim 12, wherein said faceted reflective surface includes a plurality of reflective facets.

14. The assembly of claim 13, wherein said plurality of reflective facets are disposed within a plurality of troughs separated by a plurality of diffuse reflecting partitions, wherein the plurality of troughs are configured to shield said occupant from extraneous reflections.

15. The assembly of claim 14, wherein said plurality of troughs are covered by a transparent material.

16. The assembly of claim 12, wherein said faceted reflective surface includes a plurality of electrically controlled reflective facets.

17. The assembly of claim 16, wherein said plurality of electrically controlled reflective facets is an array of electrowetting cells comprising a reflective fluid.

18. The assembly of claim 17, wherein said reflective fluid is a eutectic alloy consisting essentially of gallium, indium, and tin.

19. The assembly of claim 16, wherein said plurality of electrically controlled reflective facets is an array of electrowetting cells comprising an oil layer of opaque material overlaying a layer of reflective material.

20. A faceted reflective surface configured to be coupled to a dashboard, said faceted reflective surface comprising:

a plurality of reflective facets,
a plurality of troughs; and
a plurality of diffuse reflecting partitions, wherein the plurality of reflective facets are disposed within the plurality of troughs, wherein the plurality of troughs are separated by the plurality of diffuse reflecting partitions, wherein the plurality of troughs are configured to shield an occupant from extraneous reflections.

\* \* \* \* \*